United States Patent [19]

Lovas et al.

[11] 4,332,084
[45] Jun. 1, 1982

[54] PORTABLE BOARD MILL

[75] Inventors: Joseph R. Lovas, East Stroudsburg, Pa.; Paul J. Lovas, Blairstown, N.J.; Carl F. Koelmel, East Stroudsburg, Pa.

[73] Assignee: Cyloflex, Inc., East Stroudsburg, Pa.

[21] Appl. No.: 245,038

[22] Filed: Mar. 18, 1981

Related U.S. Application Data

[62] Division of Ser. No. 94,433, Nov. 15, 1979, Pat. No. 4,276,693.

[51] Int. Cl.³ .............................................. B27B 15/02
[52] U.S. Cl. ......................................... 30/380; 83/795
[58] Field of Search ......................... 30/371, 377, 380; 83/745, 795, 796

[56] References Cited

U.S. PATENT DOCUMENTS

| | | | |
|---|---|---|---|
| 1,478,774 | 12/1923 | Stowell | 83/796 |
| 2,722,953 | 11/1955 | Lee | 143/19 |
| 3,115,909 | 12/1963 | McManama | 83/745 X |
| 3,213,906 | 10/1965 | McManama | 83/745 |
| 3,225,799 | 12/1965 | Hayden | 30/371 |
| 4,070,757 | 1/1978 | Granberg | 83/745 |
| 4,122,604 | 10/1978 | Brown | 30/371 |
| 4,127,045 | 11/1978 | Blucher | 83/796 |
| 4,160,320 | 7/1979 | Wikoff | 30/380 |
| 4,275,632 | 6/1981 | Ross | 83/795 |

*Primary Examiner*—Jimmy C. Peters
*Attorney, Agent, or Firm*—Howson and Howson

[57] ABSTRACT

Apparatus for in-forest cutting of lumber from felled logs is provided. The apparatus comprises a frame mounting a pair of wheels around which is trained a band saw blade. A chain saw engine is releasably connected to the frame and is coupled to one of the wheels for driving the saw blade. A carriage is mounted to the frame and is adapted to extend lengthwise of the log to enable the frame to be advanced along the log as the saw blade cuts. The carriage has a series of resilient rollers which cooperate with blade guide and stabilizer assemblies to provide a straight cut. Handles are provided at opposite ends of the frame to enable workmen to mount and to dismount the apparatus and to advance the same along the log.

4 Claims, 14 Drawing Figures

PORTABLE BOARD MILL

This application is a division of application Ser. No. 094,433, filed on Nov. 15, 1979, now U.S. Pat. No. 4,276,693, issued on July 7, 1981.

FIELD OF THE INVENTION

The present invention relates to portable board mills, and more particularly, the present invention relates to portable devices for cutting lumber from timber felled in the forest.

BACKGROUND OF THE INVENTION

In recent years, there has been a demand for saws capable of cutting lumber from felled logs. Such saws are in demand because they eliminate the need to transport logs from the forest and to a saw mill, resulting in a savings of fuel and labor. Moreover, such portable saws enable lumber to be produced in remote locations where it is intended to be used.

So-called Alaska mills have been on the market. Such mills normally include attachments for standard chain saws to enable chain saws to cut boards from felled logs. Since saw chains are designed to cut transverse to the grain and not longitudinally thereof, such mills have not been as efficient as desired. Moreover, it has been difficult for even trained operators to cut straight boards efficiently with known Alaska mills. Also, so-called Alaska ladders must be nailed to the logs before the first cut is made in order to assure that a straight cut is made. This step is time consuming and requires materials not always readily available in remote forest locations. Furthermore, such mills tend to amplify undulations in successive cuts, and when cutting long boards, it is often necessary to drive wedges into the cut to prevent the board from pinching the saw blade. Also, a substantial amount of lumber is wasted because of the relatively wide kerf of a saw chain.

Various types of portable band saws are known for cutting lumber from felled logs. Examples of such saws may be found in the following U.S. Pat. Nos.: 3,530,908; 3,721,146; and 2,722,953. A hand-held band saw for splitting animal carcasses is disclosed in U.S. Pat. No. 4,160,320. One of the patented Alaska saw mills discussed above is disclosed in U.S. Pat. No. 3,225,799. Various types of commercially available saw mills are disclosed in the June 1978 issue of *Popular Science* magazine beginning at page 86.

OBJECTS OF THE INVENTION

With the foregoing in mind, a primary object of the present invention is to provide an improved portable saw mill which is capable of cutting lumber efficiently from felled logs.

It is another object of the present invention to provide a novel portable board mill which can be utilized with conventional chain saw engines to cut straight lumber from felled logs.

A further object of the present invention is to provide a unique portable board mill which is capable of being used even by relatively unskilled workmen to cut smooth, accurately dimensioned lumber expeditiously from felled logs.

As another object, the present invention provides a portable board mill which provides a self-correcting cutting action such that any undulations which may be formed in one cut are automatically eliminated in successive cuts.

Yet another object of the present invention is to provide a portable board mill which cuts relatively straight boards from lumber without requiring wedges or ancillary devices for making the first cut lengthwise of the log.

SUMMARY OF THE INVENTION

As a more specific object, the present invention provides an improved portable lumber mill which is designed to enable two workmen to cut lumber expeditiously from a fallen log. The portable lumber mill comprises a frame which mounts a pair of wheels for rotation in spaced relation in a vertical plane. A band saw blade is trained around the wheels. An engine is connected to one of the wheels by way of a conventional belt drive arrangement for rotating the wheels and hence advancing the saw blade. A carriage is mounted to the frame for movement along the top of the log. The carriage mounts a series of resilient rollers in closely spaced relation extending forwardly and rearwardly of the blade on opposite sides of the frame. Blade guiding and stabilizing assemblies are mounted to the frame behind the blade for guiding the blade in the zone of cutting and for engaging in the cut formed by the saw blade to restrain pivotal movement of the frame about a horizontal axis lengthwise of the log. The carriage is mounted to the frame in a manner which affords both vertical and tilting adjustment to enable the thickness as well as the shape of boards cut from the log to be varied. The disclosed mill enables boards to be cut with relatively flat straight sides without requiring ancillary first cut guide devices.

BRIEF DESCRIPTION OF THE DRAWINGS

The foregoing and other objects, features and advantages of the present invention should become apparent from the following description when taken in conjunction with the accompanying drawings, in which.

DESCRIPTION OF PREFERRED EMBODIMENT

Figure 1:
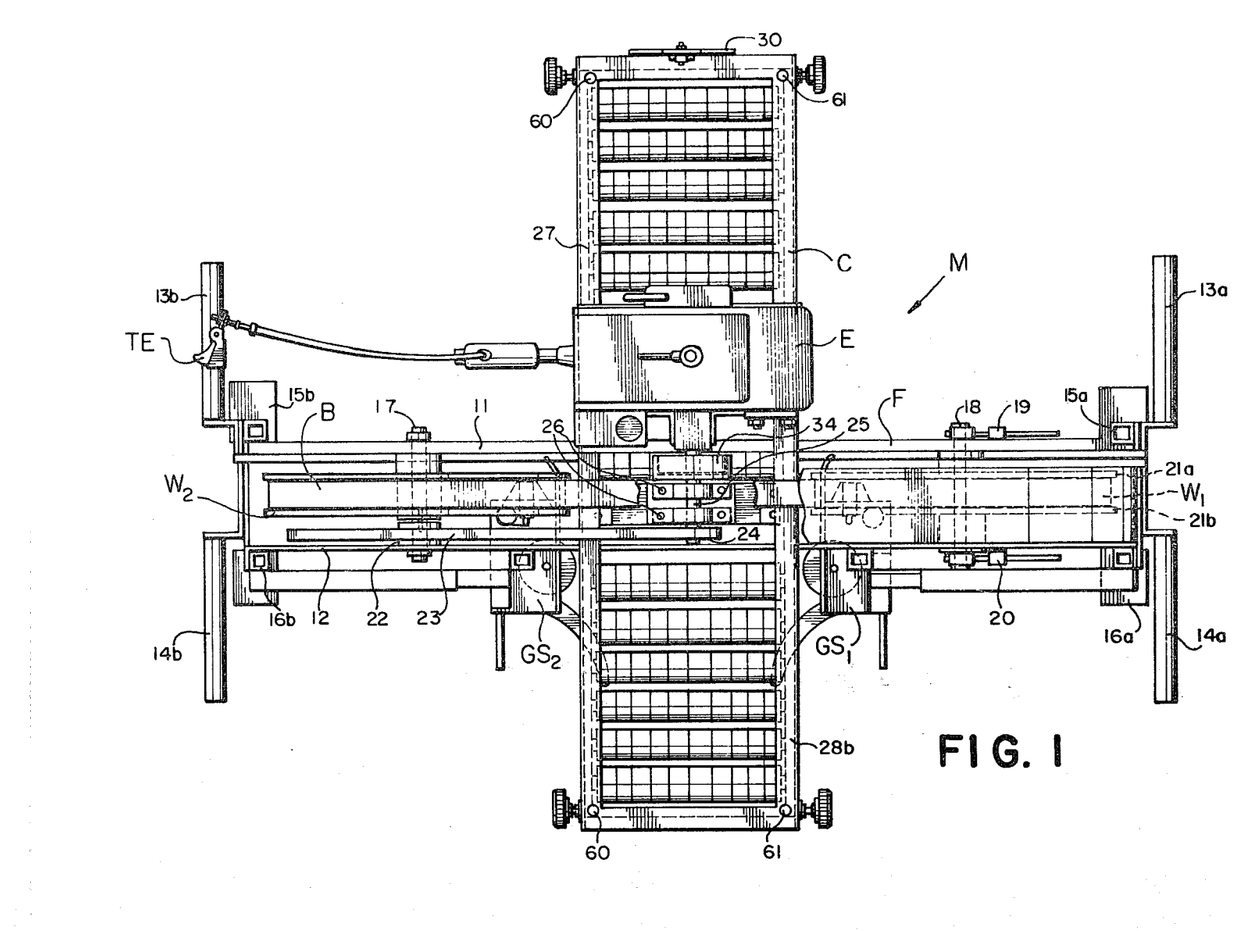
FIG. 1 is a plan view of a portable lumber mill embodying the present invention.

Referring now to the drawings, FIG. 1 illustrates a portable board mill M which embodies the present invention. As best seen therein, the board mill M comprises an elongated frame F and an elongated carriage C disposed orthogonal thereto so that the two form a cruciform plan configuration. As engine E is carried by the frame F and functions in a manner to be described to drive a band saw blade B which is trained around a pair of wheels $W_1$ and $W_2$ rotatably mounted in the frame F. A pair of blade guide and stabilizer assemblies $GS_1$ and $GS_2$ are carried by the frame F and function in a manner to be described both to guide and stabilize the board mill M as it is advanced in the direction indicated by the arrow while cutting boards.

The frame F comprises a pair of elongated arms 11 and 12 extending in spaced parallel relation and adapted to be disposed transversely with respect to the lengthwise dimension of a log L to be cut. See FIG. 2. A pair of handles 13a, 14a and 13b, 14b are mounted at opposite ends of the frame arms 11 and 12, respectively. The handles 13a-14b enable workmen both to lift the mill M and to guide the same as will be described. A remote throttle extension TE is provided on the handle 13b to control the engine speed via a Bowden cable connected to the throttle trigger on the engine E. A pair of legs 15a, 16a and 15b, 16b are also mounted at opposite ends of the frame arms 11 and 12, respectively. The legs 15a-16b function to support the mill M on the ground when it is not in use. Preferably, the frame, legs and handles are fabricated of a lightweight material such as aluminum, so that the overall weight of the entire unit, including engine is less than 50-60 lbs.

The blade drive wheels $W_1$ and $W_2$ are mounted in the frame F between frame arms 11 and 12 to rotate in a vertical plane. To this end, each wheel, such as the lefthand wheel $W_2$, is mounted for rotation on a shaft 17 which extends transversely through the frame arms 11 and 12, and suitable anti-friction bearings (not shown) are interposed between the wheel $W_2$ and the shaft 17. The righthand drive wheel $W_1$ is similarly mounted for rotation on a shaft 18 which, unlike the shaft 17, is mounted for adjustment toward and away from the shaft 17 by conventional threaded adjustment blocks and screws 19 and 20 connected to the frame arms 11 and 12, respectively. The adjustment mechanisms 19 and 20 function to enable the tension on the blade B to be set within desired operating limits. Preferably, each wheel, such as the righthand drive wheel $W_1$ has a pair of peripheral flanges 21a and 21b which function to guide the blade B as it advances around the periphery of the wheel. Furthermore, each wheel preferably has at least one peripheral groove (not shown) for accommodating the kerf of the blade B as the blade advances around the surface of the wheel.

In order to drive the blade B, at least one of the wheels $W_1$ and $W_2$ is coupled to the engine E. In the illustrated embodiment, the left wheel $W_2$ is connected to a drive pulley 22 which is connected by drive gear belt 23 to a similar pulley 24. The pulley 24 is mounted on one end of an idler shaft 25 which is supported by self-aligning pillow blocks 26,26 and which is releasably connected at its other end by an adjustable collet 34 to the automatic clutch mounted on the engine E. The collet 34 enables various chain saw engines to be used to power the board mill 10. If desired, a type of collet having internal splines which engage external splines on a spacer which in turn surrounds and connects to the clutch may be used. By varying the size of the spacer, the collet can be used with clutches of various diameters.

In the disclosed embodiment, the engine E is of nominal 15 hp. rating and runs at a normal operating speed of about 8500 rpm. With the pulley 24 having a pitch diameter of about 2 in., the pulley 22 connected to the wheel $W_2$ having a pitch diameter of about 10 in., and the diameter of the wheels $W_1$ and $W_2$ of about 14 in., the linear speed of the blade B as it advances through the cutting of the zone Z (FIG. 2) is about 4000-5000 ft. per min. Chain saw engines are particularly suited for this because of their normally high speed operation.

It has been found that cutting efficiency is correlated with the number of teeth per inch in the blade B and the horsepower of the engine E. For instance, with the engine E of a nominal 15 hp rating, the blade B should have a tooth spacing of about one tooth per two inches of blade length to provide a satisfactory board cutting speed. With engines of lower nominal horsepower, the tooth spacing should increase, such as one tooth per four inches with a 7 hp engine. The blade should have a minimum width of 1 in. and preferably be about $1\frac{1}{2}$ in. wide to avoid any tendency to tilt as it cuts due to uneven tooth sharpness. The blade should also have deep gullets to remove sawdust from the cut.

For the purpose of supporting the frame F as it advances, the carriage C comprises an elongated rectangular strut assembly 27 which is fastened across the frame members 11 and 12 and which extends forwardly and rearwardly with respect to the blade B. A rectangular congruent cage 28 underlies the strut assembly 27 and is connected thereto by means which affords vertical adjustment between the cage 28 and its mounting strut assembly 27 to enable boards of various thickness to be cut. The cage 28 has a forward or leading section 28a disposed ahead of the cutting blade B and a trailing section 28b disposed behind the cutting blade B. Each section of the cage 28 mounts a series of closely-spaced (almost touching) rollers 29,29 for rotation on axles 29' along the top of the log L, the width of the cage 28, and hence the length of each roller 29, corresponding substantially to the dimension between the inner peripheries of the wheels $W_1$ and $W_2$. The rollers extend forwardly and rearwardly of the blade B for distances at least about as great as the maximum width of the cut which can be made by the blade B.

In order to ensure a smooth cut along the length of the log L, each of the rollers is provided with a certain degree of resiliency or compressibility. In the present instance, each roller 29 is fabricated of a foamed elastomeric material, such as foam rubber, which provides both the desired degree of compressibility and a predetermined amount of friction between the roller and the surface of the log L. As may be seen in FIG. 3, the resilience of the rollers 29 enables them to accommodate irregularities in the bark or surface of the log L by deflecting as they roll over the irregularity. This has the effect of averaging surface irregularities and thus minimizing undulations of the blade as it cuts through the log L. As a result, a straighter cut is made, and if an excessive irregularity is encountered, there is a tendency for the mill M to self-correct in subsequent cuts so that pitching of the frame, and hence waviness of the cut is eliminated. The friction between the rollers and the log L assists workmen in steering the mill 10 along the length of the log L by restraining the tendency for the carriage to yaw due to the tendency for the blade B to displace the carriage laterally due to reaction forces generated during cutting.

Although the roller 29 may have a constant amount of resilience along its entire length, it is preferable for the roller 29 to be fabricated so as to have a compressibility which varies along its length, being at a maximum at the median $C_L$ of the roller 29 and at a minimum at opposite ends of the roller 29. For this purpose, it is preferable for the roller 29 to be fabricated of a series of roller members 29a,29a (FIG. 4) each having different degrees of compressibility varying from a maximum compressibility of about RO-10 (ASTM standard D 1056-77) at the roller median $C_L$ to substantial incompressibility adjacent opposite ends of the roller 29. By virtue of this structure, the greater compressibility of the roller 29 centrally of the cage 28 enables the mill 10 to accommodate to a greater extent the arcuate shape of the log L when the first cut is being made, while the relative incompressibility of the roller members inwardly of the ends of the roller 29 provides firm support for the mill 10 in all subsequent cuts because the firmer rollers are supported on the flat cut log surface adjacent its outer margins. It is noted that the axial variation in compressibility need not be at a uniform rate and that the zones of relative incompressibility may extend inwardly from opposite ends of the rollers for a substantial extent.

Figure 5:
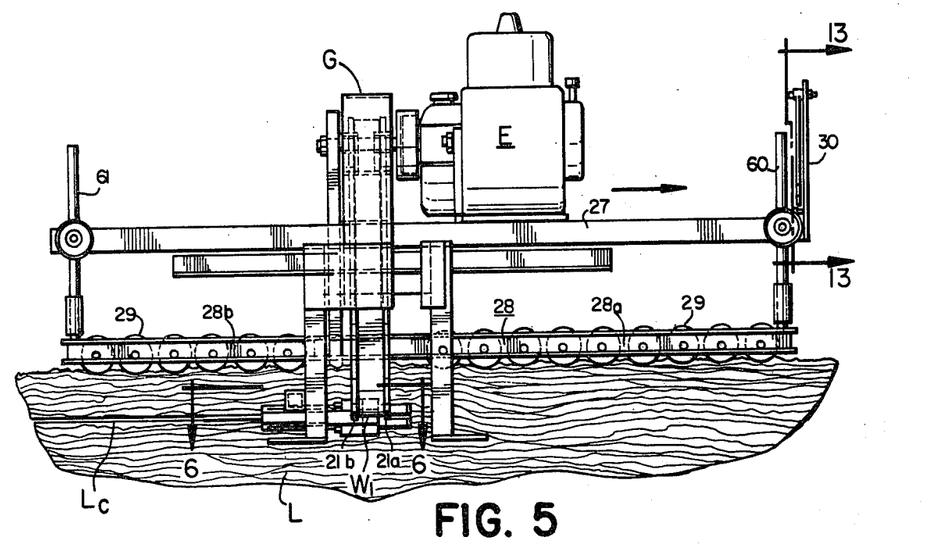
FIG. 5 is a side elevational view of the portable board mill shown advancing rightward along a log during the first cut.

Referring to FIGS. 1 and 5, it may be seen that the leading portion 28a of the cage 28 has a length greater than the trailing portion 28b thereof. Also, the engine E is mounted in such a manner that it overlies the leading portion 28a of the cage 28. This construction provides the advantage of ensuring a substantial amount of resilient roller contact with the top of the log L, both to reduce undulations in the cut surface by averaging the vertical displacement of the carriage C over a greater distance and to provide better weight distribution for the board mill 10, particularly when the mill 10 is initially placed on one end of the log at the beginning of each cut.

Figure 13:
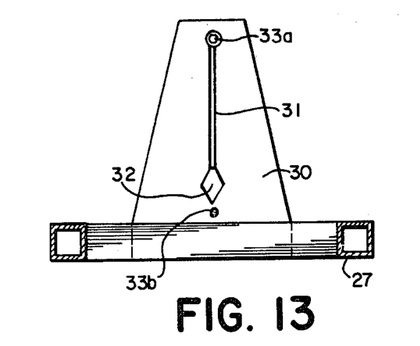
FIG. 13 is an elevational view illustrating a leveling pendulum mounted to the carriage to assist workmen to level the blade while making the first cut.

In order to assist in making the initial cut in the log L, the board mill M is provided with leveling means. In the illustrated embodiment, as best seen in FIG. 5, the leveling means includes an upstanding stanchion 30 mounted at the front end of the carriage strut assembly 27 a spaced distance ahead of the engine E. As best seen in FIG. 13, the stanchion plate 30 mounts a pendulum 31 having a weighted lower end 32 which swings relative to an indicator point 33b provided on the stanchion plate 30. The upper end of the pendulum 31 is connected to the stanchion plate 30 by a bolt 33a. Thus, the workmen standing on opposite sides of the log L may move the handles up and down in such a manner as to cause the lower end of the pendulum 31 to register with the indicator 33b thereby insuring that the blade F is level when it is initially engaged with the log L and during the initial cut.

Figures 2, 3, 4:
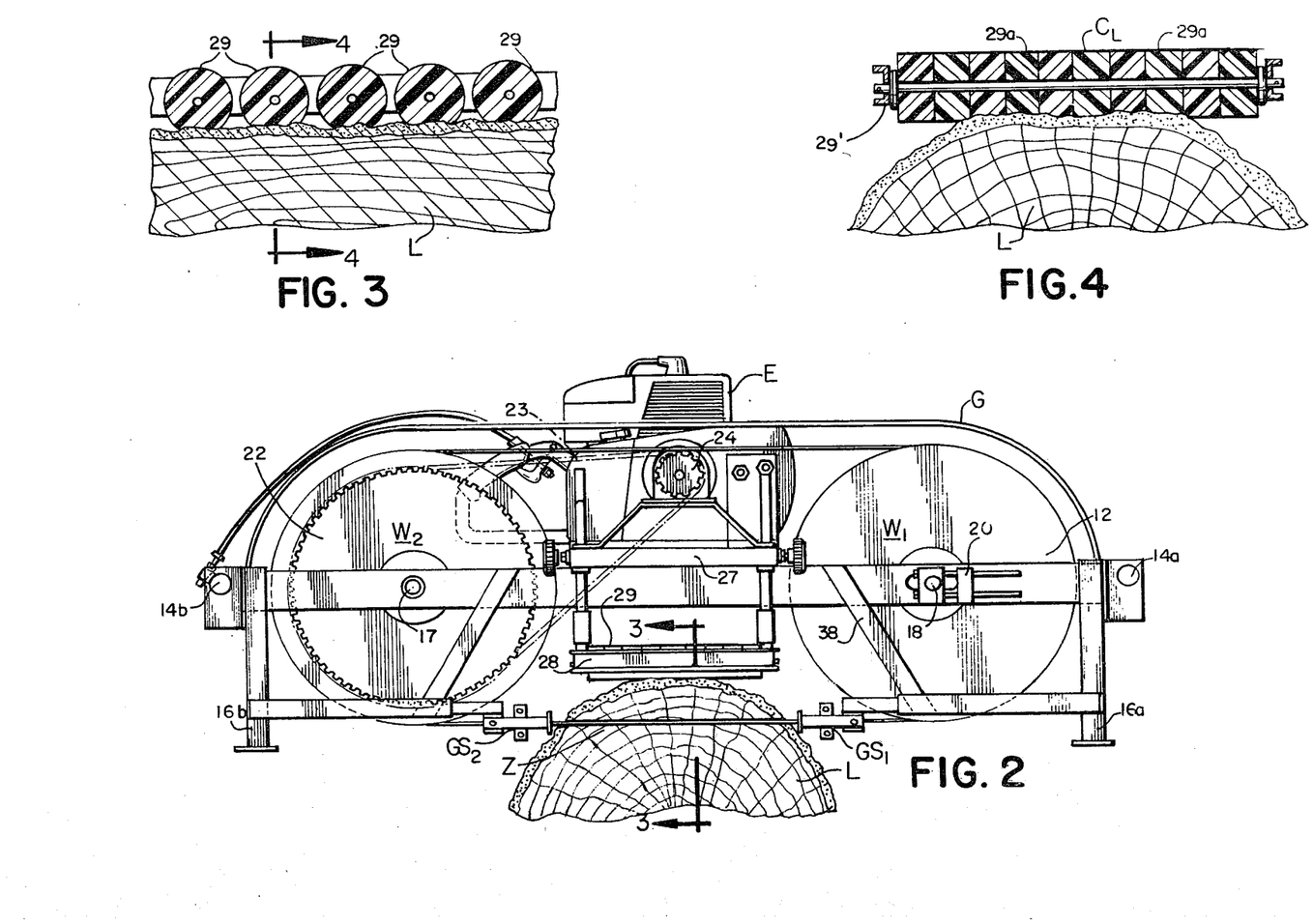
FIG. 2 is an elevational view of a portable lumber mill shown engaged with a felled log, the view looking lengthwise of the log in the direction of movement of the portable mill.
FIG. 3 is an enlarged fragmentary sectional view taken on line 3—3 of FIG. 2.
FIG. 4 is an enlarged fragmentary sectional view taken on line 4—4 of FIG. 3.

For the purpose of enhancing the cutting action of the blade B, and to stabilize the lumber mill M on the log L, the blade guide and stabilizer assemblies $GS_1$ and $GS_2$ are provided. As best seen in FIGS. 2 and 5, the guide and stabilizer assemblies $GS_1$ and $GS_2$ are disposed on opposite sides of the log L and operatively engage opposite sides of the log L in a manner to be described. Both assemblies are located on the trailing side of the frame F, and they are designed to cooperate with both the blade B and the cut $L_c$ made in the log L to minimize undulations in the cut and to help to support the blade B in the zone of cutting Z which has an effective extent corresponding approximately to the interior spacing between the peripheries of the wheels $W_1$ and $W_2$. Since both guide and stabilizer assemblies are of like construction, reference hereinafter will be made to the righthand assembly $GS_1$, it being understood that the left assembly $GS_2$ is the same, and like reference numerals apply.

Figure 6:
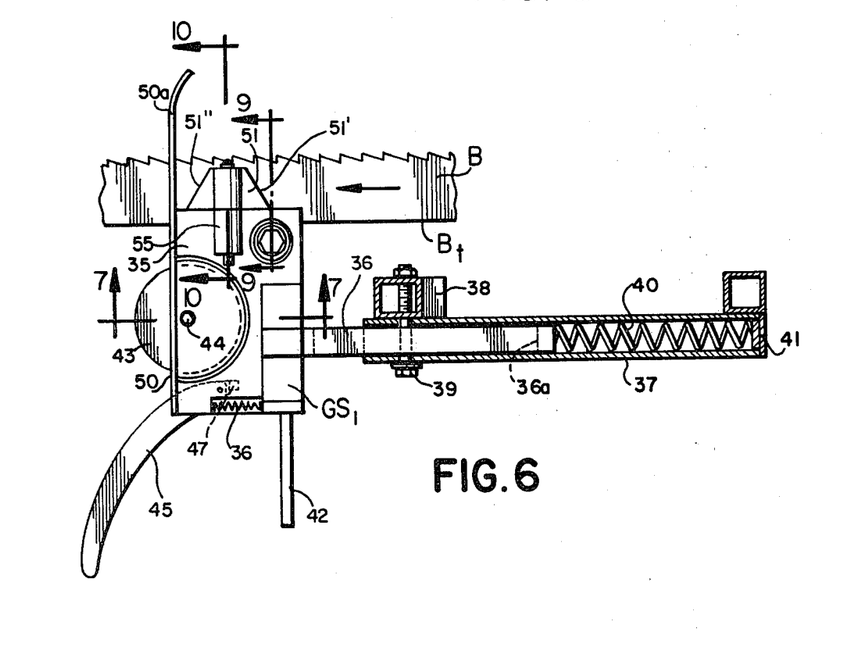
FIG. 6 is a greatly enlarged fragmentary sectional view taken on line 6—6 of FIG. 5 to illustrate blade guide and stabilizing means.
Figure 7:
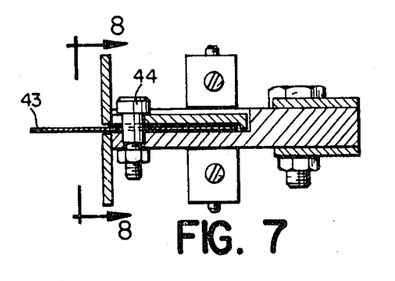
FIG. 7 is an enlarged fragmentary sectional view taken on line 7—7 of FIG. 6.

Referring now to FIG. 6, it may be seen that the righthand guide and stabilizer assembly $GS_1$ comprises a platen 35 mounted at the inner end of a plunger 36 which is slidingly received inside a tube 37 disposed horizontally adjacent the lower periphery of the wheel $W_1$ and connected to the leg 16a and an inclined brace 38 connected at its upper end to the frame member 12. The plunger 36 has a through slot 36a through which a bolt 39 passes to limit inward and outward movement of the plunger 36 relative to the tube 37. A helical compression spring 40 is interposed between the other or outer end of the plunger 36 and a closure member 41 disposed across the outer end of the tube 37. Thus, the spring 40 biases the plunger 36 leftward and thereby causes the guide and stabilizer assembly $GS_1$ to be urged into engagement with the side of the log L such as illustrated in FIG. 2. A handle 42 protrudes rearwardly from the platen 35 to enable the guide and stabilizer assembly $GS_1$ to be moved rightward against the bias of the spring 40 when initially engaging the portable board mill 10 with the log L.

The stabilizer portion of the guide and stabilizer assembly $GS_1$ is designed to engage in the cut $L_c$ made by the blade B as it advances along the log L to limit the pivotal motion of the frame F about a horizontal axis disposed lengthwise of the log L, i.e., to minimize rolling of the frame F. To this end, a circular knife or a disc 43 is mounted in a recess provided in the platen 35, and the disc 43 is mounted for rotation about a vertical axis by a bolt 44. A substantial portion of the area of the disc 43 protrudes leftward from the platen 35 to engage in the cut $L_c$ a spaced distance behind the trailing edge $B_t$ of the blade B. In order to provide additional stability to the board mill M, a second knife blade 45 is pivotally mounted to the platen 35 behind the knife disc 43. The knife 45 has an arcuate shape and extends both inwardly and rearwardly with respect to the blade B and thereby extends a substantial distance behind the trailing edge $B_t$ of the blade B. The second or trailing knife 45 is pivoted into an extended position by means of a compression spring 36 mounted in a cavity in the platen 35. A stop 47 on the platen 35 engages the secondary knife 45 to limit its pivotal movement relative to the platen 35. Since the knives are normally engaged in the cut, they tend to stabilize the frame F by preventing rolling motion of the frame as the workmen advance it along the log. The secondary knife 45 is of particular importance in the final stages of cutting when the blade is approaching the end of the log and the leading portion 28a of the cage is disengaged from the log and supported in mid-air by the workmen. The second knife blade helps to maintain the movement of the blade B substantially parallel with the cut during this phase of cutting.

Figure 8:
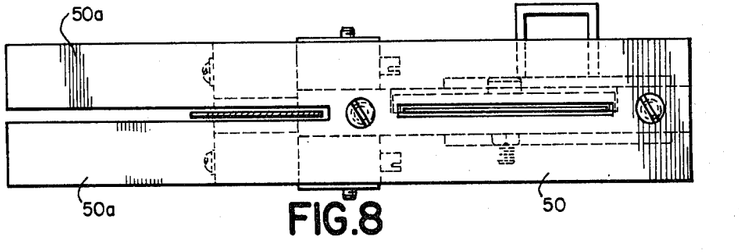
FIG. 8 is a sectional view taken on line 8—8 of FIG. 7.
Figure 9:
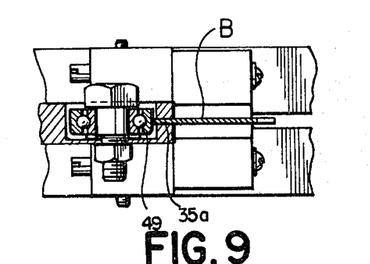
FIG. 9 is an enlarged fragmentary sectional view taken on line 9—9 of FIG. 6.

In order to support the blade B on opposite sides of the log L in the zone of cutting Z, and to ensure that the blade enters the wood flat, the leading side of the platen 35 is provided with a slot 35a (FIG. 9) which receives the rear margin of the blade B. The trailing edge $B_t$ of the blade B is backed up by a ball or roller bearing 49 which is bolted to the platen 35 and which engages the trailing edge $B_t$ of the blade B in the manner illustrated in FIG. 9. As best seen in FIGS. 6 and 8, a bifurcated or slotted shoe 50 having outturned tips 50a,50a is mounted on the inside of the platen 35 for slidably engaging the surface of the log L.

Figure 11:
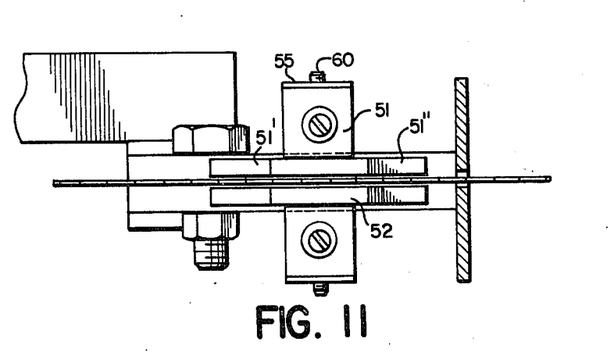
FIG. 11 is a sectional view taken on line 11—11 of FIG. 10.

A pair of pads 51 and 52 are mounted to the platen 35 on opposite sides of the blade B as illustrated in FIG. 11. Since each of the pads is of like construction to the other, reference will hereinafter be made to the upper pad 51, it being understood that corresponding reference numerals and description refers in like manner to the lower pad 52.

Referring now to FIG. 6, the upper pad 51 preferably has a trapezoidal shape with inclined surfaces 51' and 51''. The inclined surface 51' functions when the blade is moving in the direction indicated by the arrow in FIG. 6 to deflect sawdust and other foreign matter from the blade B. The pads 51 and 52 cooperate to make certain that the blade B enters the cut flat and to prevent the blade B from vibrating excessively in the zone of the cut.

Figure 10:
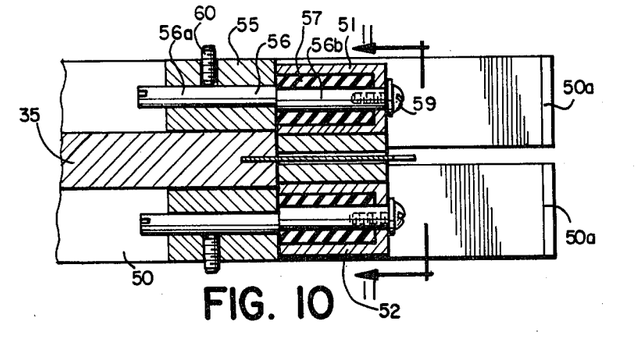
FIG. 10 is an enlarged fragmentary sectional view taken on line 10—10 of FIG. 6.

The pad 51 is mounted for adjustment into relatively closely spaced relation with the upper side of the blade B. To this end, a mounting block 55 is mounted on top of the platen 35, and an eccentric 56 connects the block 55 with the pad 51. As best seen in FIG. 10, the eccentric 56 has a slotted end 56a which is rotatably carried in a bore in the block 55, and the eccentric has an offset end 56b which is received in a rubber filled cavity in the pad 51. The rubber 57 in the pad cavity functions to absorb shock between the pad 51 and the block 55. The pad 51 is fastened into the eccentric end 56b of the eccentric 56 by a screw 59. In order to maintain the pad 51 in properly adjusted relation with respect to the blade B, a dog or set screw 60 is mounted in the block 55 and is adapted to be rotated into engagement with the slotted end 56a of the eccentric 56. With this structure, both the pads 51 and 52 may be adjusted into closely spaced relation with the opposite surfaces of the cutting blade B.

Figure 14:
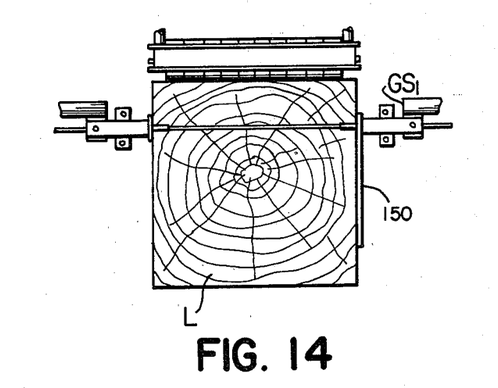
FIG. 14 is a fragmentary sectional view illustrating a modified shoe for squaring logs.

In certain instances it may be desirable to produce a square timber from a log L. To facilitate squaring, one of the shoes, preferably the shoe associated with the righthand guide and stabilizer assembly $GS_1$ may be vertically elongated in a downward direction so as to extend a substantial distance below and orthogonal to the plane of cutting of the blade B in a manner illustrated in FIG. 14. The shoe extension 150 thereby engages the log L for a substantial distance and assists in enabling the portable board mill M to square a log L.

Figure 12:
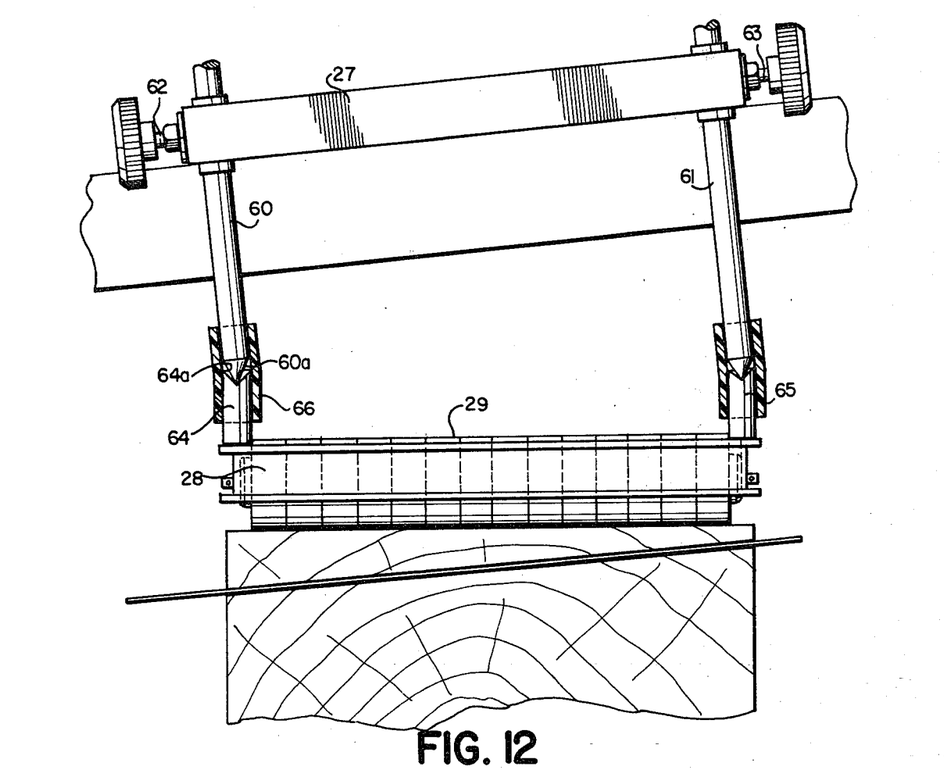
FIG. 12 is a fragmentary sectional view illustrating the carriage tilted with respect to the frame for cutting tapered boards.

The portable board mill M is capable of cutting flat or tapered boards from the log L. For this purpose, means is provided to mount the roller cage 28 for both straight vertical adjustment with respect to the frame F and to afford pivotal adjustment therebetween. As best seen in FIG. 12, such adjustment is provided by means of a pair of rods 60 and 61 calibrated in inches which are slidably received at opposite ends of the carriage strut assembly 27. The roller cage 28 mounts a pair of upstanding posts 64 and 65 which are normally coaxial with the rods 60 and 61 when the board mill 10 is cutting parallel sided lumber. To afford the desired tilting action, however, the lower end of each rod, such as the rod 60, has a tapered or convex terminus 60a which is received in a conical or concave terminus 64a of the post 64. An elastic tube 66 tightly engages the rod 60 and post 64 and extends across the point of juncture therebetween to provide a flexible coupling which affords the desired tilting action in a simple yet highly effective manner.

To utilize the apparatus described thus far, the log L is first trimmed of branches, etc. and laid substantially horizontal. The engine E is started to rotate the blade wheels $W_1$ and $W_2$ for causing the blade B to advance at the desired operating speed. Thereafter, two workmen grip the handles 13a, 14a and 13b, 14b and place the leading end 28a of the carriage C on the top side of the log L. Depending upon the diameter of the log L, the workmen may find it necessary initially to pull the guide and stabilizer assemblies $GS_1$ and $GS_2$ outwardly when they approach the end of the log before cutting. The workmen then advance the board mill 10 forwardly in the direction indicated by the arrow in FIG. 5 while simultaneously observing the position of the pointer 32 of the pendulum 31 at the front of the carriage C and working the handles up and down to maintain the cutting blade B substantially horizontal. As the mill 10 reaches the opposite end of the log L, the trailing knife 45 maintains engagement in the cut $L_c$ to prevent the workmen from tilting the mill 10 and cocking the blade B. After the first cut has been made, and the slab removed, boards may be cut to any desired thickness simply by repeating the above process.

In view of the foregoing, it should be apparent that the present invention provides an improved portable lumber or board mill which is capable of efficiently producing top quality boards from felled logs in remote forest locations. The mill is relatively simple to use. It is designed to ensure flat cuts over long log lengths. Moreover, because of the narrow thickness of the blade, more lumber can be cut from a given diameter log than would be possible with an Alaska board mill. The mill does not require an Alaska ladder to make the first cut, and anti-pinching wedges are not needed. The board mill also cuts relatively quickly, so that output per man hour is high.

While a preferred embodiment of the present invention has been described in detail, various modifications, alterations and changes may be made without departing from the spirit and scope of the present invention as defined in the appended claims.

We claim:

1. In a portable mill for cutting lumber from a log, including a frame adapted to be disposed transverse to the log, a pair of wheels mounted for rotation in a vertical plane in said frame, a band saw blade trained around said wheels, means for rotating at least one of said wheels to cause the blade to form a cut in the log, and a carriage carried by said frame to afford movement of the frame along the log as the blade advances to cut the log lengthwise, the improvement comprising: guide means carried by said frame on the trailing side of said cutting blade for slidably receiving the blade on opposite sides of the zone of cutting of the blade, means mounting said guide means for movement along the blade toward and away from the log, and means biasing said guide means into engagement with the sides of the log, whereby the guide means advances closely along opposite sides of the log to guide the blade in the zone of cutting.

2. Apparatus according to claim 1 wherein said guide means includes a pair of guide assemblies disposed in horizontally-spaced relation, each guide assembly including a platen, a shoe mounted to said platen and having a blade receiving slot and an outturned tip adapted to engage the log, a bearing mounted to said platen for rotation about a vertical axis and adapted to engage the trailing edge of the blade, and means on said platen located adjacent the shoe for restraining motion of the blade as it advances into and through the cutting zone.

3. Apparatus according to claim 2 wherein said blade restraining means includes pads and means mounting said pads to said platen for movement toward and away from the blade.

4. Apparatus according to claim 3 wherein said pad mounting means includes a block mounted to the platen, an eccentric having one end pivotally carried in said block and another offset end engaging said pad, means for rotating said eccentric relative to said block, and means carried by said block for releasably engaging said one end of the eccentric to lock the pad in an adjusted position closely adjacent the side of the blade.

* * * * *